United States Patent
Hayasaka

(10) Patent No.: US 10,063,333 B2
(45) Date of Patent: *Aug. 28, 2018

(54) CONTROL DEVICE THAT MIXES AUDIO SIGNALS AND RECORDING MEDIUM STORING A PROGRAM THAT MIXES AUDIO SIGNALS

(71) Applicant: TEAC CORPORATION, Tokyo (JP)

(72) Inventor: Kaname Hayasaka, Saitama-ken (JP)

(73) Assignee: TEAC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,051

(22) Filed: Jan. 17, 2017

(65) Prior Publication Data

US 2017/0207868 A1 Jul. 20, 2017

(30) Foreign Application Priority Data

Jan. 20, 2016 (JP) ................................ 2016-009225

(51) Int. Cl.
| | |
|---|---|
| *H04B 1/00* | (2006.01) |
| *H04H 60/04* | (2008.01) |
| *G06F 3/16* | (2006.01) |
| *H04R 3/04* | (2006.01) |
| *G11B 20/10* | (2006.01) |

(52) U.S. Cl.
CPC ............ *H04H 60/04* (2013.01); *G06F 3/165* (2013.01); *G11B 20/10527* (2013.01); *H04R 3/04* (2013.01); *G11B 2020/10546* (2013.01)

(58) Field of Classification Search
None
See application file for complete search history.

(56) References Cited

U.S. PATENT DOCUMENTS

| | | |
|---|---|---|
| 2004/0064210 A1 | 4/2004 | Puryear et al. |
| 2006/0074637 A1 | 4/2006 | Berreth |
| 2007/0168196 A1 | 7/2007 | Torrini et al. |
| 2009/0007153 A1 | 1/2009 | Mysore et al. |

(Continued)

FOREIGN PATENT DOCUMENTS

| | | |
|---|---|---|
| JP | 01-189751 A | 7/1989 |
| JP | 08-063421 A | 3/1996 |

(Continued)

OTHER PUBLICATIONS

"CAPTURE PROBE™—A Powerful Streaming Solution." audio-probe.com, audio-probe.com/en/documentation/capture-probe/?ckattempt=2.*

(Continued)

*Primary Examiner* — James Mooney
(74) *Attorney, Agent, or Firm* — Seed Intellectual Property Law Group LLP

(57) ABSTRACT

A device is provided which mixes and records two types of audio signals processed under standards different from each other; in particular, an audio signal of ASIO standard and an audio signal of WDM standard. An audio interface is connected to a computer, and an audio signal is input to the computer. A mixer module of the computer mixes an audio signal which is effect-processed by an ASIO application and an audio signal which is reproduced by a WDM application, outputs the mixed signal to the audio interface, supplies the mixed audio signal to the WDM application, and records the sound.

5 Claims, 5 Drawing Sheets

(56) References Cited

U.S. PATENT DOCUMENTS

2009/0204413 A1 8/2009 Sintes et al.
2012/0300960 A1 11/2012 Mackay et al.
2013/0060363 A1 3/2013 Warren

FOREIGN PATENT DOCUMENTS

| | | |
|---|---|---|
| JP | 3896810 B2 | 3/2007 |
| JP | 4405242 B2 | 1/2010 |
| JP | 2010-532046 A | 9/2010 |
| JP | 2013-054748 A | 3/2013 |
| WO | 2004/107165 A1 | 12/2004 |

OTHER PUBLICATIONS

Jones, Hollin. "Review: Audioprobe Spartan Cue 110." Ask.Audio, Apr. 21, 2015, https://ask.audio/articles/review-audioprobe-spartan-cue-110.*

"Spartan Cue 110." audio-probe.com, audio-probe.com/en/product/audio-interface-en/spartan-cue-110/.*

Burel, "Voicemeeter Banana, The Advanced Virtual Device Mixer for Windows!" downloaded from http://web.archive.org/web/20160113082706/http://vb-audio.pagesperso-orange.fr/voicemeeter/banana.htm on Jun. 6, 2017, 13 pages.

Extended European Search Report, dated Jun. 22, 2017, for European Application No. 17151807.9-1879, 8 pages.

"Apogee Quartet—User's Guide," Apogee Electronics Corporation, Version 1, Sep. 2012, 68 pages.

"Pro Tools® Reference Guide," Avid, Version 10.0, 2011, 1288 pages.

Extended European Search Report for EP Application No. 17151809.5-1879, dated Jun. 22, 2017, 9 pages.

Extended European Search Report for EP Application No. 17151813.7-1879, dated Jun. 22, 2017, 7 pages.

Extended European Search Report for EP Application No. 17151814.5-1879, dated Jun. 22, 2017, 9 pages.

* cited by examiner

CONTROL DEVICE THAT MIXES AUDIO SIGNALS AND RECORDING MEDIUM STORING A PROGRAM THAT MIXES AUDIO SIGNALS

CROSS REFERENCE TO RELATED APPLICATION

The entire disclosure of Japanese Patent Application No. 2016-009225 filed on Jan. 20, 2016, including the specification, claims, drawings, and abstract, is incorporated herein by reference in its entirety.

TECHNICAL FIELD

The present disclosure relates to a control device having a function of mixing an audio signal.

BACKGROUND

In the related art, control devices, such as a personal computer, for editing and processing an audio signal have been proposed. Japanese Patent No. 3896810 discloses a control device comprising: an audio signal unit including a plurality of input ports which are connected to external acoustic devices, a sound chip that has at least a microphone input terminal and a line input terminal, and a selector that connects one of the input ports to at least one of the microphone input terminal and the line input terminal based on a selection signal; a display; and a controller that is realized by an operating system including a device driver and a main CPU and that produces a selection signal and outputs the selection signal to the selector. The controller displays, in a state where an external acoustic device is connected to one of the input ports of the audio signal unit, adjusters for adjusting at least sound volume levels of the microphone signal and the line signal; produces, when the sound volume level adjuster of the microphone signal is operated among the displayed adjusters, a selection signal to instruct selection of the microphone input terminal as the terminal to be connected; and produces, when the sound volume level adjuster of the line signal is operated, a selection signal to instruct selection of the line input terminal as the terminal to be connected.

As standards provided for an application API for inputting and outputting an audio signal, ASIO (Audio Stream Input Output) and WDM (Windows Driver Model) are used. In particular, ASIO is widely in use as a standard having a small latency (delay of the audio signal). For example, an application for executing an effect process may be launched as an application corresponding to the ASIO, a desired effect process may be applied on the audio signal which is input from the microphone input terminal, and the resulting signal may be output.

Meanwhile, there are a certain number of users, for example, who wish to launch an application corresponding to WDM to reproduce (play back) music and perform along with the music; that is, to enjoy karaoke. In this case, because an audio signal of the ASIO application and an audio signal of the WDM application would exist in a mixed manner, these audio signals must be processed.

In the combination of the audio interface and the computer (personal computer or the like) of the related art, the music data reproduced by the WDM application of the computer is input to the audio interface, and is output to the outside from the audio interface. The audio signal which is input from the microphone input terminal is output to the computer and mixed with the music data in the computer, and the mixed signal is output. When the mixed audio signal is returned from the audio interface to the computer for recording the mixed audio signal, a loop is created, and so-called howling is caused. As a result, there had been a problem in that the mixed signal must be output to another computer or sound recording device, for recording the sound.

SUMMARY

An advantage of the present disclosure lies in the provision of a control device which can mix and record two types of audio signals processed under standards different from each other; in particular, an audio signal of the ASIO standard and an audio signal of the WDM standard.

According to one aspect of the present disclosure, there is provided a control device comprising: a first processor that processes a first audio signal of a first standard; a second processor that processes a second audio signal of a second standard; a mixing processor that supplies to the first processor the first audio signal which is input, receives the first audio signal which is processed by the first processor, receives the second audio signal which is processed by the second processor, produces a mixed audio signal by adding the received first audio signal and the received second audio signal, and outputs the mixed audio signal; and a sound recorder that records the mixed audio signal received from the mixing processor.

According to another aspect of the present disclosure, the first processor applies an effect process on the first audio signal, and the second processor reproduces the second audio signal.

According to another aspect of the present disclosure, the control device further comprises a mode selection switch, and the mixing processor outputs the received first audio signal to an external device when the mode selection switch is in a first mode, and the mixing processor produces the mixed audio signal by adding the received first audio signal and the received second audio signal and outputs the mixed audio signal to the external device when the mode selection switch is in a second mode.

According to another aspect of the present disclosure, the first standard is the ASIO standard, the first audio signal is an ASIO audio signal, the second standard is the WDM standard, and the second audio signal is a WDM audio signal.

According to yet another aspect of the present disclosure, the first processor, the second processor, the mixing processor, and the sound recorder are one or more processors.

According to another aspect of the present disclosure, there is provided a program recording medium which records a program which, when executed, causes a computer to execute a process comprising: displaying an operation panel including a mode selection switch on a display; inputting an ASIO audio signal; executing an effect process on the ASIO audio signal which is input; and, in response to a selection signal from the mode selection switch on the operation panel, outputting the ASIO audio signal on which the effect process is applied when the selection signal indicates a first mode, and producing a mixed audio signal by adding the effect-processed ASIO audio signal and a WDM audio signal, and outputting and recording the mixed audio signal when the selection signal indicates a second mode.

According to various aspects of the present disclosure, two types of audio signals processed under standards different from each other; in particular, an audio signal of the ASIO standard and an audio signal of the WDM standard, can be mixed, and the signal can be recorded in accordance with the WDM standard.

BRIEF DESCRIPTION OF DRAWINGS

Embodiment(s) of the present disclosure will be described by reference to the following figures, wherein.

DESCRIPTION OF EMBODIMENTS

Figure 1:
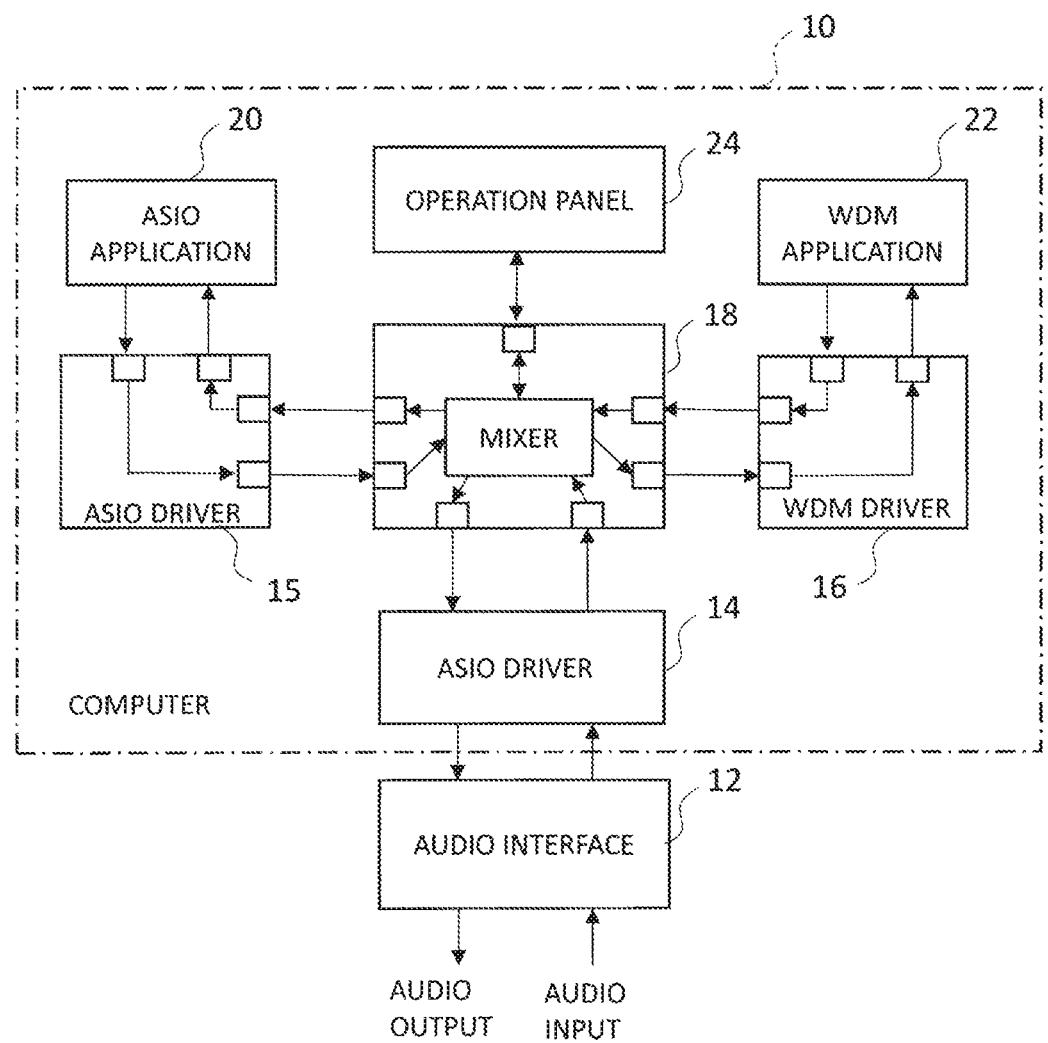
FIG. 1 is a block diagram of an embodiment of the present disclosure.

An embodiment of the present disclosure will now be described with reference to the drawings.

A basic principle of the present embodiment will first be described.

In the present embodiment, a first audio signal of a first standard and a second audio signal of a second standard, the first and second standards being different from each other, co-exist in a same computer, processing of the first audio signal is enabled, and, at the same time, mixing of the first audio signal and the second audio signal is enabled.

Specifically, the first audio signal is processed by a driver of the first standard and an application of the first standard, but, normally, the second audio signal, which is produced by a driver of a second standard different from the first standard and an application of the second standard, cannot be processed by the driver of the first standard and the application of the first standard.

In consideration of this, in the present embodiment, a mixer module or a mixer driver which expands the function of the driver of the first standard is newly installed in the computer, and, with the mixer driver, exchange of the audio signal is enabled between the driver and application of the first standard and the driver and application of the second standard. The mixer module has two selection modes including a first mode and a second mode. When the first mode is selected, the mixer module provides the first audio signal from the driver of the first standard to the application of the first standard, and outputs, from an output terminal, the first audio signal which is processed (for example, effect process) by the application of the first standard. When the second mode is selected, the mixer module launches, in parallel with the processing of the first audio signal, an application of the second standard to reproduce the second audio signal, inputs the second audio signal via a driver of the second standard, adds the processed first audio signal and the reproduced second audio signal to produce a mixed audio signal, and outputs the mixed audio signal from the output terminal. Further, when the second mode is selected, the mixer module supplies the mixed audio signal to the application of the second standard via the driver of the second standard as necessary, and executes processes such as sound recording. The mixer module processes the first audio signal and processes the second audio signal, and mixes the first audio signal and the second audio signal.

The mixer module thus co-operates with an operating system (OS) of the computer, the driver of the first standard, and the driver of the second standard, and has functions:

to receive the first audio signal from the driver of the first standard;

to supply the first audio signal to the application of the first standard;

to supply the first audio signal which is processed by the application of the first standard to the driver of the first standard;

to receive the second audio signal from the driver of the second standard;

to add and mix the first audio signal and the second audio signal; and to supply the mixed audio signal to the driver of the second standard.

By having such functions, the computer can mix two types of audio signals processed under standards different from each other, and output or record the mixed signal.

The application of the second standard for reproducing the second audio signal and the application of the second standard for recording the mixed audio signal may be the same or different from each other. For example, the second audio signal may be reproduced by an application dedicated for reproduction, and the mixed audio signal may be recorded by an application dedicated for sound recording.

The mixer module or the mixer driver may be considered to be a device driver bundled on an audio interface connected to the computer when the audio signal is input to the computer via the audio interface for producing music. The device driver may be distributed on a recording medium such as a CD-ROM along with the audio interface, or via the Internet.

Next, an example configuration will be described in which the first standard is ASIO (Audio Stream Input Output) and the second standard is WDM (Windows Driver Model).

FIG. 1 is a block diagram of a control device according to the present embodiment. The control device specifically is formed with a computer 10, such as a personal computer (PC), comprising a CPU, a ROM, a RAM, and a memory.

The computer 10 includes a first ASIO driver 14, a second ASIO driver 15, a WDM driver 16, a mixer module 18, an ASIO application 20, a WDM application 22, and an operation panel 24. The ASIO driver 14, the ASIO driver 15, the WDM driver 16, the mixer module 18, the ASIO application 20, and the WDM application 22 are programs executed by the CPU, and the operation panel 24 is displayed on a display when the CPU executes the mixer module 18.

An audio interface 12 is connected to the computer 10 by, for example, a USB or the like. The audio interface 12 includes a microphone input terminal, an audio input/output terminal, and an amplifier. In the audio interface 12, an audio signal is input from the microphone input terminal, amplified, and output to the computer 10, and an audio signal is input from the computer 10, and output from the audio output terminal.

The ASIO driver 14, the ASIO driver 15, and the ASIO application 20 are program modules which process an audio signal according to the ASIO standard, and are installed in advance in a program memory such as a ROM or a hard disk drive, or are downloaded from a predetermined server via the Internet and installed. An example of the ASIO application 20 is a program which applies an effect process on the audio signal. The effect process includes a noise removal process, a reverb process, a volume process, a delay (echo) process, a high-pass process, a low-pass process, an inversion process, an equalizing process, or the like. An audio signal which is processed according to the ASIO standard will be hereinafter referred to as an ASIO audio signal.

The WDM driver 16 and the WDM application 20 are program modules which process an audio signal according to the WDM standard. An example of the WDM application 22 is a music reproduction program or a sound recording program, and includes Windows Media Player or the like. An audio signal which is processed according to the WDM standard will be hereinafter referred to as a WDM audio signal.

The mixer module 18 is provided between the ASIO driver 14, the ASIO driver 15, and the WDM driver 16, and integrally processes the ASIO audio signal and the WDM audio signal. Specifically, the mixer module 18 has, in addition to functions to individually process the ASIO audio signal and the WDM audio signal, a function to mix the ASIO audio signal and the WDM audio signal. The mixer module 18 is downloaded and installed from a predetermined server via the Internet, as a device driver bundled to the audio interface 12. Desirably, the WDM driver 16 is downloaded and installed along with the mixer module 18, and the same installer includes both the mixer module 18 and the WDM driver 16. The WDM driver 16 outputs the WDM audio signal to the mixer module 18, and supplies the ASIO audio signal or the mixed audio signal from the mixer module 18 to the WDM application 22, and co-operates with the mixer module 18.

The operation panel 24 is a panel displayed on the display of the computer 10, and sets a function of the mixer module 18. In the present embodiment, a mode can be switched between a DAW mode and a BROADCAST/KARAOKE mode by the operation panel 24. In the DAW mode, the mixer module 18 processes the input ASIO audio signal with the ASIO application 20, and outputs the processed ASIO audio signal to the outside. That is, the mixer module 18 receives input of the ASIO audio signal from the ASIO driver 14, and supplies the ASIO audio signal to the ASIO application 20, and, at the same time, receives input of the ASIO audio signal processed by the ASIO application 20 from the ASIO driver 15. The mixer module 18 further receives, from the WDM driver 16, input of the WDM audio signal reproduced by launching the WDM application 22, and adds and mixes the processed ASIO audio signal and the WDM audio signal. The mixer module 18 supplies the mixed audio signal to the ASIO driver 14, supplies the processed ASIO audio signal to the WDM driver 16 without further processing, and records the signal with the WDM application 22 according to the setting.

On the other hand, in the BROADCAST/KARAOKE mode, the mixer module 18 processes the input ASIO audio signal with the ASIO application 20, adds and mixes the WDM audio signal reproduced by the WDM application 22 to the ASIO audio signal, and outputs the mixed audio signal to the outside or records in the memory or the like with the WDM application 22. That is, the mixer module 18 receives input of the ASIO audio signal from the ASIO driver 14, and supplies the ASIO audio signal to the ASIO application 20, and, at the same time, receives input of the ASIO audio signal processed by the ASIO application 20 from the ASIO driver 15. The mixer module 18 further receives, from the WDM driver 16, input of the WDM audio signal reproduced by launching the WDM application 22, and adds and mixes the WDM audio signal to the processed ASIO audio signal. The mixer module 18 supplies the mixed audio signal to the ASIO driver 14 and to the WDM driver 16, and records the signal with the WDM application 22 according to the setting.

In the related art, even when the ASIO driver 14, the ASIO driver 15, and the ASIO application 20, and the WDM driver 16 and the WDM application 22 are both installed on the computer 10, the drivers and applications individually and independently process the audio signal. For example, the ASIO application 20 is launched, the effect process is applied on the audio signal which is input from the microphone input terminal, and the resulting signal is output from the audio output terminal, or the WDM application 22 is launched and the music data stored in the memory is reproduced and output. Thus, it has not been possible to mix and output the ASIO audio signal and the WDM audio signal. As described above, even if the signals are mixed, when the mixed audio signal is again returned to the computer in order to record the mixed audio signal, a loop is created and howling is caused. As a result, the signal must be output to and recorded on another computer or sound recording device.

In the contrary, in the present embodiment, the mixer module 18 mixes the ASIO audio signal and the WDM audio signal, and an audio signal for sound recording is supplied to the WDM driver 16 separately from the audio signal which is reproduced, and the WDM application 22 receives the audio signal for sound recording from the WDM driver 16 and records the sound. Therefore, the mixed audio signal can be recorded in the same computer 10 without the loop on the hardware being created and howling being caused.

The mixer module 18 can, in addition to outputting the ASIO audio signal to the outside via the ASIO driver 14, supply the ASIO audio signal to the WDM application 22 via the WDM driver 16 similar to the mixed audio signal. Thus, it is also possible to supply the ASIO audio signal to the WDM application 22 in the DAW mode and to record the sound.

Figure 2:
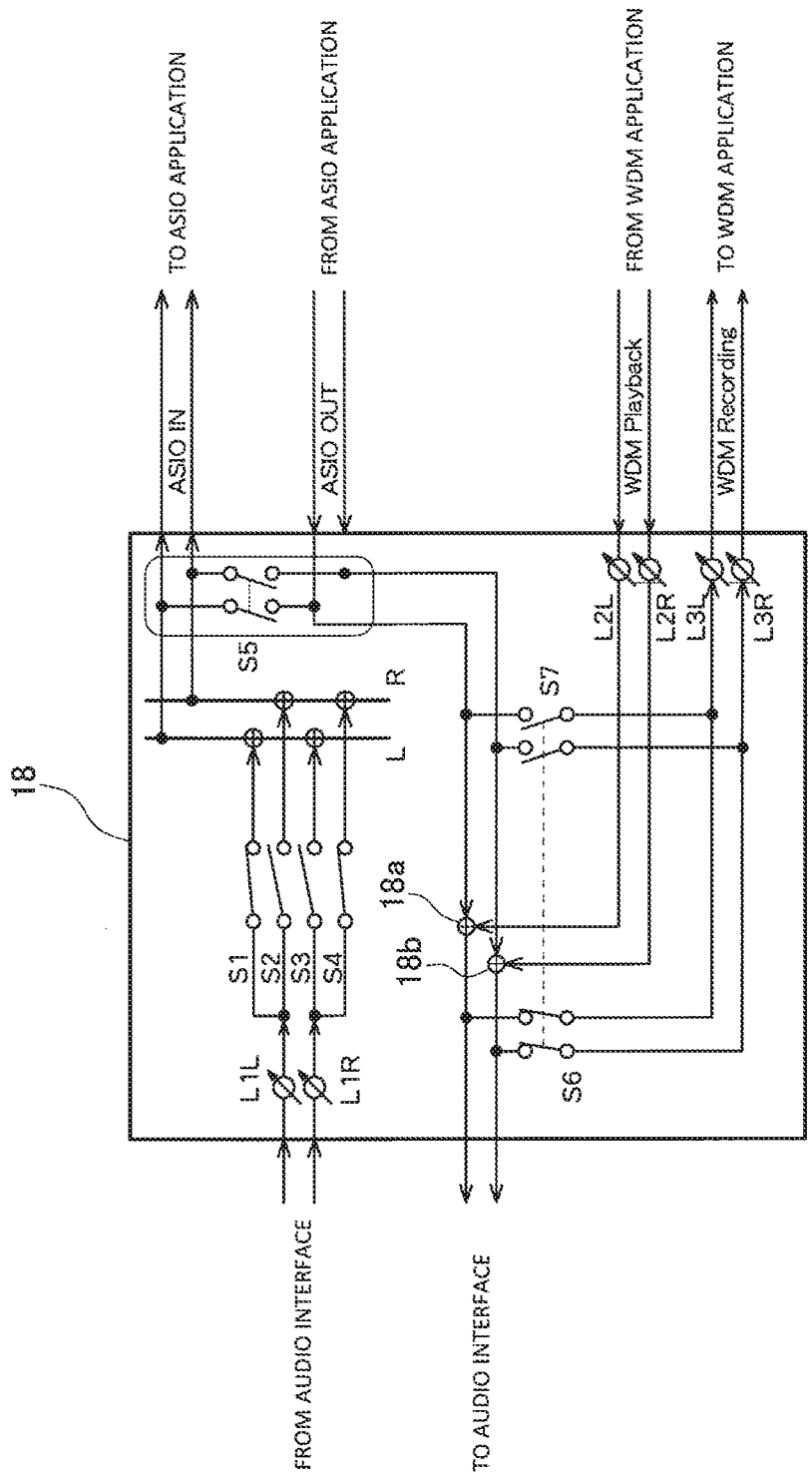
FIG. 2 is an equivalent circuit diagram of a mixer module in the embodiment of the present disclosure.

FIG. 2 is an equivalent circuit diagram of the mixer module 18. As described above, the mixer module 18 is a program module, and FIG. 2 shows the functions as an equivalent circuit structure. The functions of FIG. 2 are realized, on the hardware, by the CPU, with the operating system (OS) of the computer and the mixer module 18.

The mixer module 18 includes faders L1L, L1R, L2L, L2R, L3L, and L3R, switches S1~S7, and adders 18a and 18b.

An ASIO audio signal from the audio interface 12 is supplied to the faders L1L and L1R via the ASIO driver 14. The fader L1L corresponds to a microphone input 1 of the audio interface 12, and the fader L1R corresponds to a microphone input 2 of the audio interface 12. The fader L1L adjusts the level of the input ASIO audio signal and supplies the same to the switches S1 and S2. The fader L1R adjusts the level of the input ASIO audio signal, and supplies the same to the switches S3 and S4.

The switches S1~S4 are input assign switches, and determine which of the ASIO audio signals from the microphone input terminals 1 and 2 are to be assigned to the L channel and to the R channel. Specifically, the switch S1 is switched ON when the microphone input terminal 1 is to be assigned to the L channel, the switches S1 and S2 are switched ON when the microphone input terminal 1 is to be assigned to the L channel and the R channel, the switch S3 is switched ON when the microphone input terminal 2 is to be assigned to the L channel, and the switches S3 and S4 are switched ON when the microphone input terminal 2 is to be assigned to the L channel and the R channel. Further, the switches S1 and S4 are switched ON when the microphone input terminal 1 is to be assigned to the L channel and the microphone input terminal 2 is to be assigned to the R channel, and the switches S2 and S3 are switched ON when the microphone input terminal 1 is to be assigned to the R channel and the microphone input terminal 2 is to be assigned to the L channel.

The switch S5 is a bypass switch, is switched ON when the ASIO application 20 does not exist, and is switched OFF when the ASIO application 20 exists and the effect process is to be applied by the ASIO application. Alternatively, the switch S5 may be switched ON also when the ASIO application 20 exists, but the effect process is not to be applied. When the switch S5 is switched OFF, the ASIO audio signals of the L channel and the R channel are supplied as ASIO IN from the mixer module 18 to the ASIO application 20 via the ASIO driver 15, various effect processes which are already described are executed, and the processed ASIO audio signal is input to the mixer module 18 as ASIO OUT. The processed ASIO audio signal or the ASIO audio signal which is bypassed by the switch S5 being switched ON is supplied to the adders 18a and 18b.

The WDM audio signal which is reproduced by the WDM application 22 is supplied to the faders L2L and L2R via the WDM driver 16. The faders L2L and L2R adjust the level of the input WDM audio signal, and supply the resulting signal to the adders 18a and 18b.

The adders 18a and 18b add and mix the ASIO audio signal which is effect-processed or which is not effect-processed and the WDM audio signal, and output the resulting signal to the audio interface 12 via the ASIO driver 14. When the WDM audio signal does not exist, the adders 18a and 18b do not mix, or mix a silent sound, and output the ASIO audio signal without further processing.

The switch S6 is a switch for recording the mixed audio signal, and is switched ON when recording the sound. When the switch S6 is switched ON, the mixed audio signal from the adders 18a and 18b is supplied to the faders L3L and L3R. The faders L3L and L3R adjust the level of the mixed audio signal, and supply the resulting signal to the WDM application 22 via the WDM driver 16. The WDM application 22 records the sound by recording the mixed audio signal in a recording medium such as a semiconductor memory or a hard disk drive.

The switch S7 is a switch for recording the ASIO audio signal without processing, and is switched ON during sound recording. When the switch S7 is switched ON, the ASIO audio signal is supplied to the faders L3L and L3R without being added in the adders 18a and 18b. The faders L3L and L3R adjust the level of the ASIO audio signal, and supply the resulting signal to the WDM application 22 via the WDM driver 16. The WDM application 22 records the sound by recording the ASIO audio signal on a recording medium such as a semiconductor memory or a hard disk drive.

The switches S6 and S7 are linked, and one of the switches is selectively switched ON. That is, when the switch S6 is switched ON, the switch S7 is switched OFF, and when the switch S7 is switched ON, the switch S6 is switched OFF.

Figure 3:
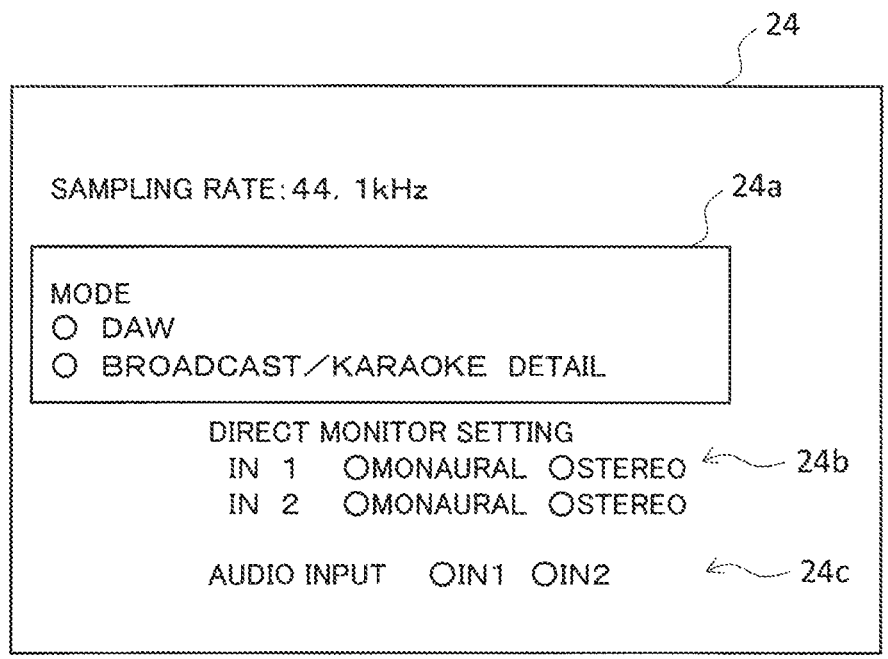
FIG. 3 is an explanatory diagram of an operation panel of the embodiment of the present disclosure.

FIG. 3 shows an example configuration of the operation panel 24 displayed on the display of the computer 10. On the operation panel 24, in addition to a sampling rate, a mode selection switch 24a, a monitor setting switch 24b, and an audio input setting switch 24c are displayed, and a user can input a desired mode and setting.

The mode selection switch 24a is a switch for selectively selecting one of the DAW mode and the BROADCAST/KARAOKE mode. When the DAW mode is selected, as already described, the mixer module 18 supplies the ASIO audio signal from the ASIO driver 14 to the ASIO application 20 via the ASIO driver 15, adds and mixes the WDM audio signal which is input from the WDM driver 16 with the ASIO audio signal which is processed by the ASIO application 20 and input from the ASIO driver 15, and outputs the resulting signal to the ASIO driver 14. Alternatively, in the DAW mode, the mixer module 18 may supply the ASIO audio signal processed by the ASIO application 20 to the WDM application 22 via the WDM driver 16 and record the sound. When the BROADCAST/KARAOKE mode is selected, the mixer module 18 mixes the ASIO audio signal which is processed (or which is not processed) by the ASIO application and the WDM audio signal reproduced by the WDM application 22, outputs the resulting signal to the ASIO driver 14, and outputs the resulting signal in parallel to the WDM application 22 via the WDM driver 16 and records sound. In the case of BROADCAST, the WDM application 22 distributes the mixed audio signal via the Internet. In either case of sound recording and distribution via the Internet, the mixed audio signal is simultaneously output to the audio interface 12, and is output from the audio output terminal of the audio interface 12. Thus, the user can monitor the mixed audio signal with headphones or the like.

The monitor setting switch 24b is a switch for setting whether each of the microphone input terminals 1 and 2 is to be assigned to monaural or stereo.

The audio input setting switch 24c is a switch for selecting availability/unavailability of the microphone input terminals 1 and 2.

Figure 4:
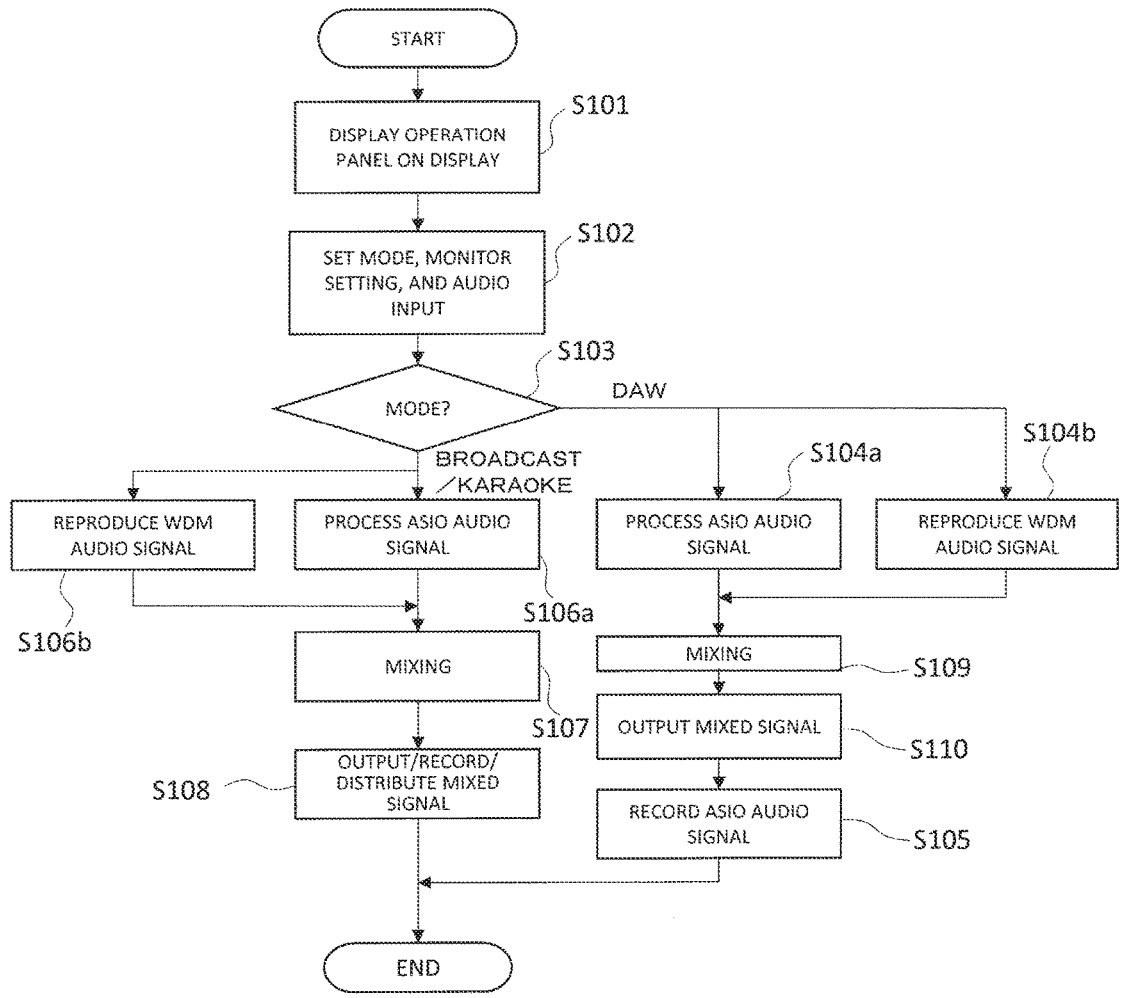
FIG. 4 is a process flowchart of the embodiment of the present disclosure.

FIG. 4 is an overall process flowchart of the present embodiment, and shows a process executed by the CPU of the computer 10. The CPU functions as a first processor which processes an ASIO audio signal which is a first audio signal of a first standard, a second processor which processes a WDM audio signal which is a second audio signal of a second standard, a mixing processor which produces a mixed audio signal by adding the processed ASIO audio signal and the processed WDM audio signal and outputs the mixed audio signal, and a sound recorder that records the mixed audio signal.

The CPU, upon reading and executing the mixer module 18, first displays the operation panel 24 shown in FIG. 3 on the display (S101). The user operates the operation panel to set the mode, the monitor setting, and the audio input (S102).

Next, the CPU determines whether the set mode is the DAW mode or the BROADCAST/KARAOKE mode (S103). When the mode is the DAW mode, the CPU receives input of the ASIO audio signal from the ASIO driver 14, launches an ASIO application 20 launched by the user (which may be automatically launched with the execution of the mixer module 18), and executes effect processes such as echo (S104a). In parallel to this process, the CPU launches the WDM application 22 to reproduce the WDM audio signal (S104b), and produces a mixed audio signal by adding the ASIO audio signal obtained in S104a and the WDM audio signal obtained in S104b (S109). The CPU then outputs the produced mixed audio signal to the audio interface 12 (S110), and supplies the data to the WDM application 22 so that the processed ASIO audio signal can be recorded by recording on a semiconductor memory, a hard disk drive, or the like (S105). When the ASIO application 20 does not exist, the CPU bypass-processes the ASIO audio signal without executing the effect process, and outputs the ASIO audio signal to the audio interface 12. The process of the ASIO audio signal of S104a includes such a bypass process.

On the other hand, when it is determined in S103 that the mode is the BROADCAST/KARAOKE mode, the CPU receives input of the ASIO audio signal from the ASIO driver 14, and, when execution of the effect process is selected, launches the ASIO application 20 (which may be launched by the user or automatically launched according to the setting) and executes any effect process such as echo (S106a). When the execution of the effect process is not selected, the CPU bypass-processes the signal in S106a. In addition, in parallel to this process, the CPU launches the WDM application 22 and reproduces the WDM audio signal (S106b), and produces a mixed audio signal by adding the ASIO audio signal obtained in S106a and the WDM audio signal obtained in S106b (S107). Alternatively, a configuration may be employed in which, during mixing, the level of the ASIO audio signal and the level of the WDM audio signal can be independently adjusted. The CPU outputs the produced mixed audio signal to the audio interface 12. In addition, the CPU launches the WDM application 22, and records the mixed audio signal by recording on a semiconductor memory, a hard disk drive, or the like, or distributes the same via the Internet (S108).

As described, in the present embodiment, the ASIO and the WDM audio signals co-exist in the same computer 10, the ASIO audio signal and the WDM audio signal can be integrally processed, and the audio signals can be mixed and output or recorded. In the present embodiment, because the signal process is processed as software in a program, there is no need for adding or changing the hardware, and a desired process can be realized solely by the setting using the operation panel 24.

The present disclosure is not limited to such a configuration, and various modifications are possible.

For example, in the present embodiment, as shown in FIG. 1, the ASIO driver 14, the ASIO driver 15, the mixer module 18, and the WDM driver 16 are shown as separate program modules, but alternatively, these program modules may be provided as a single program; that is, a monolithic program module from a server on the Internet. In consideration of ASIO, the mixer module 18 may be considered as a module or a plugin for expanding the function of the ASIO driver 14 of the related art; that is, a program module of a hierarchical structure, and the mode selection switch 24a of the operation panel 24 shown in FIG. 3 may be considered as a switch for selecting execution/non-execution of the plugin.

Further, in the present embodiment, the DAW mode is exemplified as the first mode and the BROADCAST/KARAOKE mode is exemplified as the second mode. However, the present disclosure is not limited to such a configuration, and, for example, a mixing non-execution mode may be employed as the first mode and the mixing mode may be employed as the second mode. In other words, the device may include two modes that can be selectively chosen, wherein in one mode the mixing is not executed and the ASIO audio signal is output, and in the other mode the ASIO audio signal and the WDM audio are mixed.

The mixer module 18 or the like of the present embodiment is provided to the computer 10 via a communication line such as the Internet, but alternatively, the mixer module 18 or the like may be stored in a recording medium such as a CD-ROM or a DVD-ROM, and installed on the computer 10 via the recording medium. The CPU of the computer 10 executes the above-described functions by reading and executing the mixer module 18 or the like stored in a program memory.

Figure 5:
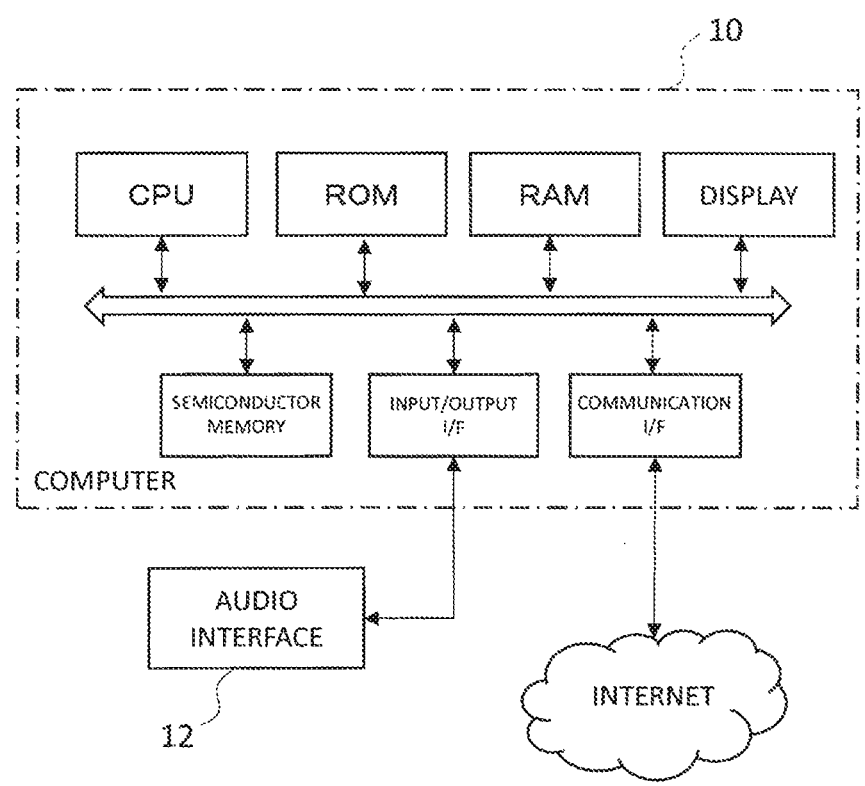
FIG. 5 is a system structural diagram of the embodiment of the present disclosure.

FIG. 5 shows a specific example configuration of a system structure of the present embodiment. The computer 10 comprises a CPU, a ROM, a RAM, a semiconductor memory, an input/output interface (I/F), a communication interface (I/F), and a display. An example of the input/output I/F is the USB. The audio interface 12 and the computer 10 are connected to each other by the input/output I/F. The ROM stores programs such as the ASIO driver 14, the ASIO driver 15, the WDM driver 16, the mixer module 18, the ASIO application 20, and the WDM application 22. The ASIO driver 14, the ASIO driver 15, the WDM driver 16, and the mixer module 18 are downloaded from a server on the Internet connected via the communication I/F. The CPU functions as the first processor, the second processor, the mixing processor, and the sound recorder, and executes the processing shown in FIG. 4 by reading various programs stored in the ROM. The CPU displays the operation panel 24 on the display and accepts a mode selection signal, and executes the mixing process according to the mode selection signal. The CPU outputs the produced mixed audio signal to the audio interface 12, and records the produced mixed audio signal on the semiconductor memory for sound recording. The semiconductor memory may be connected externally to the computer 10. Alternatively, the produced mixed audio signal is distributed via the Internet.

The invention claimed is:

1. A control device comprising:
   a processor; and
   a memory storing a program which, when executed, causes the control device to perform:
   a first application process that processes a first audio signal of a first standard;
   a first driver process that performs processing according the first standard;
   a second application process that processes a second audio signal of a second standard;
   a second driver process that performs processing according to the second standard;
   a mixing process that supplies to the first application process the first audio signal which is input, receives the first audio signal which is processed by the first application process, receives the second audio signal which is processed by the second application process, produces a mixed audio signal by adding the received first audio signal and the received second audio signal, supplies the mixed audio signal to the first driver process and the second driver process, and outputs the mixed audio signal; and
   a sound recording process that records the mixed audio signal received from the second driver process.

2. The control device according to claim 1, wherein the first application process applies an effect process on the first audio signal, and
   the second or application process reproduces the second audio signal.

3. The control device according to claim 1, further comprising:
   a mode selection switch, the mode selection switch being in one of a first mode and a second mode, wherein the mixing process outputs the received first audio signal to an external device when the mode selection switch is in the first mode, and the mixing process produces the mixed audio signal by adding the received first audio signal and the received second audio signal and outputs the mixed audio signal to the external device when the mode selection switch is in the second mode.

4. The control device according to claim 1, wherein
the first standard is ASIO (Audio Stream Input Output) standard, and the first audio signal is an ASIO audio signal, and
the second standard is WDM (Windows Driver Model) standard, and the second audio signal is a WDM audio signal.

5. A non-transitory computer-readable program recording medium storing a program which, when executed, causes a computer to execute processing comprising:
displaying an operation panel including a mode selection switch on a display, one of a first mode and a second mode being selectable via the mode selection switch;
inputting an ASIO (Audio Stream Input Output) audio signal;
executing an effect process on the ASIO audio signal which is input;
a first driver process that performs processing according an ASIO standard;
a second driver process that performs processing according to a WDM (Windows Driver Model) standard; and
in response to a selection signal from the mode selection switch of the operation panel,
outputting the ASIO audio signal on which the effect process is applied when the selection signal indicates the first mode, and
producing a mixed audio signal by adding the effect-processed ASIO audio signal and a WDM audio signal, outputting the mixed audio signal, providing the mixed audio signal to the first driver process and the second driver process, and recording the mixed audio signal received from the second driver process when the selection signal indicates the second mode.

* * * * *

UNITED STATES PATENT AND TRADEMARK OFFICE
CERTIFICATE OF CORRECTION

PATENT NO. : 10,063,333 B2
APPLICATION NO. : 15/408051
DATED : August 28, 2018
INVENTOR(S) : Kaname Hayasaka Page 1 of 1

It is certified that error appears in the above-identified patent and that said Letters Patent is hereby corrected as shown below:

In the Claims

Column 10, Line 58:
"the second or application process reproduces the second"
Should read:
--the second application process reproduces the second--.

Signed and Sealed this
Twenty-sixth Day of February, 2019

Andrei Iancu
*Director of the United States Patent and Trademark Office*